2,945,354
LIQUID OXYGEN CONVERSION SYSTEM

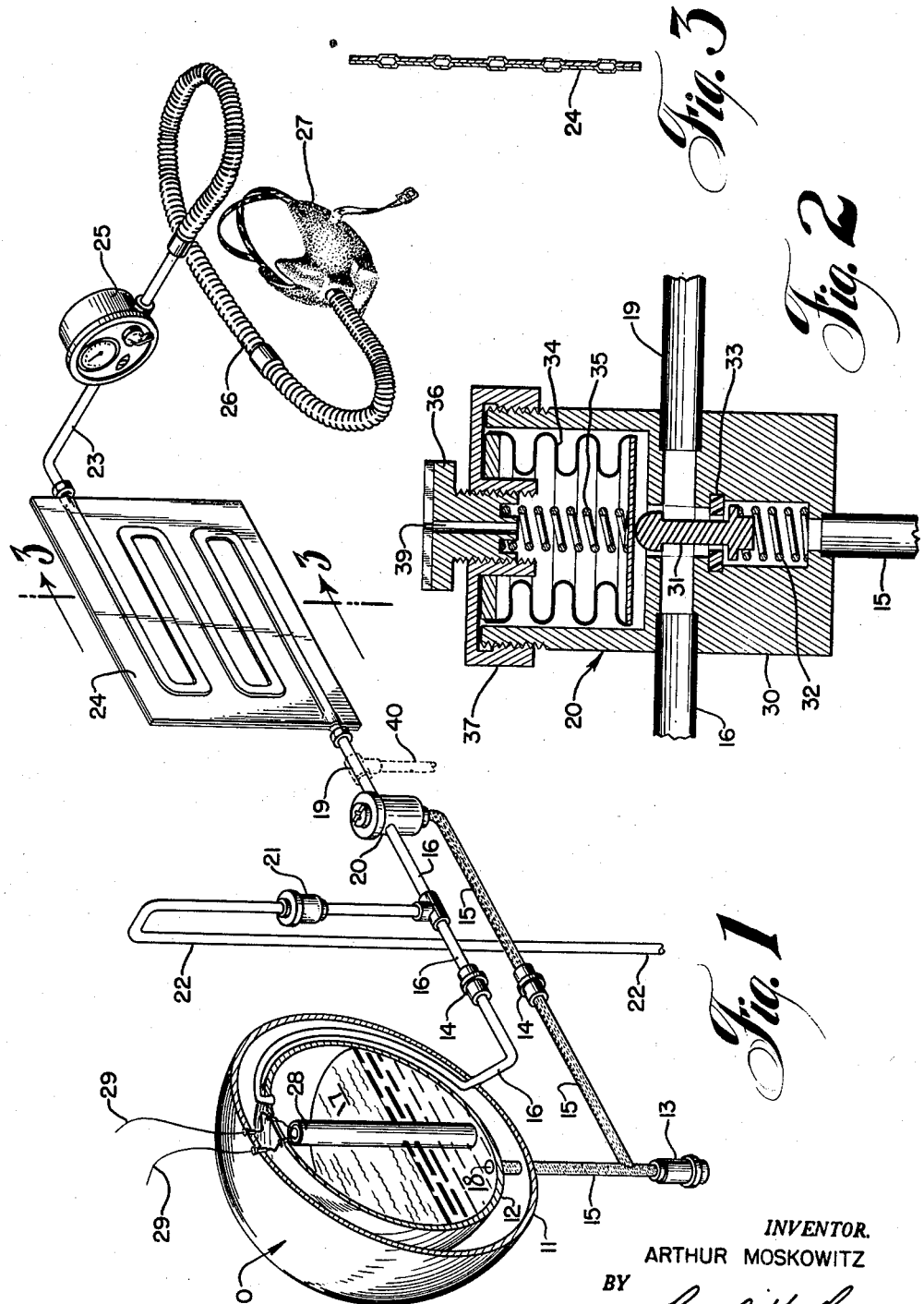

Arthur Moskowitz, Reynoldsburg, Ohio, assignor to North American Aviation, Inc., Columbus, Ohio Filed Mar. 18, 1957, Ser. No. 646,894

5 Claims. (Cl. 62—51)

This invention relates broadly to a liquid oxygen conversion system, and is more particularly concerned with an improved form of liquid oxygen conversion system which may be utilized to supply oxygen of a quality suitable for breathing purposes. The liquid oxygen conversion system of my invention is particularly well-suited to aircraft applications.

Modern piloted aircraft have been so designed and developed that high-altitude flight operations of extended duration have become quite common, and the fact that air encountered at relatively high altitude levels is quantitatively lacking in oxygen has required that such aircraft be provided with a source of breathing oxygen for supplemental purposes. Supplemental breathing oxygen must be provided for the operating personnel of the aircraft during the aforementioned extreme flight conditions if their operating ability or efficiency is to be satisfactorily maintained, and failure to provide an adequate source of supplementary breathing oxygen of the proper quality will, in effect, reduce the performance capabilities of such aircraft.

Acceptable practice has generally required that liquid oxygen be utilized as the primary source of supplemental breathing oxygen in such aircraft applications. It is well known that oxygen exhibits an extremely large volumetric expansion when passing from the liquid state to the gaseous state and this inherent characteristic is indicative of the fact that large volumes of oxygen of a quality suitable for breathing might be stored in a relatively small space if such oxygen can be stored in a liquid state and subsequently converted to usable form. However, satisfactory means or apparatus having small, space-occupying requirements must be provided for converting the stored liquid oxygen to gaseous form if the system is to prove feasible for aircraft applications.

Liquid oxygen conversion systems such as those heretofore provided in aircraft have proven deficient on occasion. Personnel have been severely or permanently injured at times because of the apparatus failing to properly convert all stored oxygen from an inherently dangerous form to a usable form. Further, oxygen supplies within the system have not always been adequately or fully conserved for their intended use. In addition, excessive maintenance problems have upon occasion existed because of the presence of an unnecessary number of functional components in the system.

To overcome these deficiencies I advocate the use of a liquid oxygen conversion system utilizing a properly located pressure-responsive, liquid oxygen flow-control valve and a properly located pressure build-up line in combination with other components of particular function and/or location. The object of this arrangement is to provide a liquid oxygen conversion system which will supply proper quality breathing oxygen at all times during operation of the system.

Another object of my invention is to provide an apparatus for liquid oxygen conversion which has minimum space requirements for installation.

Another object of this invention is to provide a liquid oxygen conversion system which utilizes low-temperature gaseous oxygen to facilitate flow of liquid oxygen from the system storage component into the system converter component.

Another object of my invention is to provide a liquid oxygen conversion system which will optimumly conserve the oxygen supply contained within the system during periods of low or no demand.

Another object of this invention is to provide a liquid oxygen conversion system which is readily modifiable to to provide increased capacity in terms of supplying breathing oxygen to additional personnel.

A still further object of this invention is to provide a liquid oxygen conversion system comprised of a minimum number of functional components, thereby making available to the art a system that is relatively simple to fabricate, economical to manufacture, and comparatively free of maintenance difficulties.

Other objects and advantages of my invention will become more apparent during the course of the following description, particularly when taken in connection with the accompanying drawing.

In the drawing, wherein like numerals are employed to designate like parts throughout the same:

Fig. 1 is a perspective schematic view of the liquid oxygen conversion system of my invention illustrating its various components in their proper relationship to each other;

Fig. 2 is a sectional elevational view of the pressure-responsive, liquid oxygen flow-control valve utilized therein; and Fig. 3 is a sectional view of the system converter component taken at line 3—3 of Fig. 1.

The liquid oxygen conversion system of my invention preferably utilizes a Dewar type container 10 for the storage of liquid oxygen. As illustrated, container 10 is provided with a conventional air-evacuated space or vacuum intermediate shells 11 and 12; however, additional thermal insulation characteristics may be had by injecting a granular form insulating material into the air-evacuated space. Shells 11 and 12 are of spherical shape, and it is preferred that they be fabricated of a metallic material such as aluminum or stainless steel.

Shell 12 of container 10 may be filled with liquid oxygen when the container is either connected to or removed from the system, and filling is preferably accomplished through filler valve connection 13. This particular fitting is provided with integral check-valve means to prevent reverse-flow of liquid oxygen therethrough.

Removal of container 10 from the system may be accomplished through the use of couplings 14 provided in liquid oxygen conducting line 15 and in vent or pressure build-up line 16. Such couplings are preferably of the well-known quick-disconnect type and that coupling provided in liquid line 15 should be provided with integral valve means which become operative to stop flow through the coupling when its separable components are disengaged. Thus, when container 10 is removed from the system there should be no natural flow of liquid oxygen from shell 12.

During the filling of container 10 prior to flight or other use, shell 12 should be vented to the atmosphere and this is accomplished through line 16. If the filling operation is to be accomplished while the container remains aboard the aircraft, it is suggested that a disposal line, functionally similar to disposal line 22, be connected to vent line 16 in order that combustion hazards be minimized.

Disposal line 22 functions, during operation of the system, to carry excess gaseous oxygen from relief valve 21 to a point overboard the ship. If disposal line 22 is furnished as a flexible line, a quick-disconnect coupling similar to 14 might be provided thereon to connect line 22 to relief valve 21; disposal line 22 can then be coupled to line 16 to provide satisfactory vent and disposal means for shell 12 while it is being filled aboard the aircraft.

During operation of the system, liquid oxygen, designated generally as 17, flows from the container through an outlet 18 located in the bottom thereof and thence into liquid conducting line 15. After passing through a pressure-actuated flow-control valve 20, liquid flows through component 19 of the liquid conducting line and then into the converter component or heat exchanger component 24. Heat, transferred from air environmental to the system to the liquid oxygen, causes it to evaporate or boil and to be thus transformed into a gas. This particular conversion of the liquid oxygen occurs for the most part within heat exchanger 24. Component 19 of the liquid oxygen conducting line may alternately contain liquid oxygen or gaseous oxygen depending upon prevailing demand conditions.

It should be pointed out that at standard atmospheric pressurese liquid oxygen evaporates into a gaseous phase at a temperature of −297° Fahrenheit, and the volumetric expansiono ratio is approximately 860 to 1. The evaporation temperature and expansion ratio will vary somewhat with varying pressure conditions, but generally they remain of the same magnitude.

Also, throughout this description reference may be made to specific pressures, temperatures, and the like as being typical for this particular system or apparatus; such are to be understood as being by way of example only, and are not to be interpreted as being of a critical nature unless so specified. In this respect, it might be pointed out that a typical system pressure during normal operation is 65–70 pounds per square inch gage (p.s.i.g.). The system pressure exists almost uniformly throughout the gaseous and liquid oxygen contained within the storage component 10, heat exchanger 24, and interconnecting lines; static head variation are the cause of minor differences.

Located in liquid conducting line 15 is valve means 20 which is of a normally open, pressure-actuated type, and functions to regulate the flow of liquid oxygen from container 10 to heat exchanger 24. Details relating to the construction of valve means 20 are shown in Fig. 2, and they will be hereinafter more fully referred to. Also, it should be mentioned that other forms of valve means having the characteristics herein specified can be utilized effectively in the liquid oxygen conversion system of my invention. For example, an "in-line" type of normally-open pressure-actuated, flow-control valve might be used.

A vent or pressure build-up line 16 is provided to interconnect the uppere interior portion of shell 12 with the gaseous phase of the system. In Figs. 1 and 2 an extreme of vent line 16 is connected to the body of valve means 20, but as an alternative, and particularly if an "in-line" type of valve is used, the connection might be made at a point in line component 19.

Flow of liquid oxygen from container 10 to heat exchanger 24 is facilitated by the presence of vent line 16. This passageway provides for pressure equalization between points of its extremes, and when flow-control valve 20 is actuated to permit flow, gravitational forces will cause liquid oxygen to flow from contaner 10, through the valve means 20 and then through line component 19 into heat exchanger 24. Were a vent line not included, difficulty in causing flow of liquid oxygen from container 10 could well be encountered.

One extreme of vent line 16 is connected with the gaseous phase of the system at a point in the system intermediate the flow-control valve means and the heat exchanger 24 to utilize relatively colder gases for fulfillment of a pressure equalization function. Gaseous oxygen contained in this portion of the system is generally much lower in temperature than those gases contained in the system downstream of heat exchanger 24 and hence with the vent connection located as herein described, relatively warmer gases are not spilled into container 12 to cause premature pressure build-ups.

In addition to greatly delaying system pressure build-ups and thus more fully conserving the system oxygen supply, the system of my invention is provided with a continuous, open vent passageway between the upper portion of the storage container and the gaseous phase of the system. As shown in Fig. 1 when valve means 20 is operatively open and to the extent that portions of liquid oxygen body 17 are elevated above the inlet opening o fheat exchanger 24, liquid oxygen will flow from storage container 10 to heat exchanger 24 by virtue of gravitational forces alone.

Flow-control valve 20 is normally open, and is responsive to gas pressures existing within shell 12, pressure build-up line 16, component 19 of liquid line 15, heat exchanger 24, and supply line 23. By way of example, valve 20 may be so adjusted as to stop the flow of liquid oxygen therethrough at a system pressure of 70 p.s.i.g. or higher; system pressures of 65 p.s.i.g. or less would allow valve means 20 to be fully open. With this arrangement the working pressure of the system is in the range of 65–70 p.s.i.g.

Converter component or heat exchanger 24 is preferably of a "plate" type, and functions to heat the liquid oxygen flowed thereinto to cause it to be changed from the liquid state to a gaseous state. Liquid oxygen is received from component 19 of liquid conducting line 15, and gaseous oxygen is delivered from the heat exchanger to supply line 23.

A plate type heat exchanger is preferred for a number of reasons. First, the plate type unit exhibits superior heat transfer characteristics over the coil-type heat transfer tubes heretofore used; this is paricularly ttrue if aluminum or like metals are used in its fabrication. Second, a plate type heat exchanger can provide the system converter component with substantial thermal mass or thermal inertia. Thirdly, components of this type may be easily and economically fabricated using conventional techniques.

Heat exchanger plate 24 may be fabricated by welding together metal sheets having co-registering, die-formed passageways provided therein. The periphery of such an assembly is generally seam welded, and areas intermediate the passageways are often spot welded at close intervals. Another method of fabrication utilizes a roll-bonding technique employing stop-weld materials to define the passageways. After rolling and bonding, the passageways are formed by injecting high pressure air or liquid into the stop-weld material zones located interior of the laminate. Conventional sheet and tube construction might also also be used to form the plate-like heat exchanger.

Care must be taken in sizing the heat exchanger plate, and in sizing and spacing either the integral passageways provided therein or the tubing assembled thereto,. Adequate heat transfer capacity in relation to the quantity demand for gaseous oxygen can be provided only if minimum plate ambient temperature, minimum acceptable gaseous oxygen delivery temperature, maximum oxygen flow requirement, and metal thermal conductivity of heat exchanger 24 are all anticipated or considered.

The system of my invention also includes relief valve means 21 which is located intermediate vent line 16 and disposal line 22. Relief valve means 21 may be set to relieve the system of all pressures in excess of 110 p.s.i.g. System pressures in the range of 70–110 p.s.i.g. will primarily exist only during periods of no gaseous oxygen demand and are caused by normal liquid oxygen boil-off due to inefficiency of the container insulation.

Oxygen regulator 25, flexible hose 26, and breathing mask 27 are provided for the convenience of an individual user of the system. By proper adjustment, the delivery of oxygen and/or air from oxygen regulator 25 may be controlled as to percentage oxygen content in accordance with the individual's immediate requirements. Although regulator 25 as shown is of the diluter-demand, positive pressure type, other types not incorporating dilution features will work satisfactorily with the system of this invention. Use of a proper plate-type heat exchanger 24 in applications involving minimum space availabilities will assure the fact that inherently dangerous liquid oxygen will not reach the oxygen regulator component, and thereby cause probable injury to the individual being supplied oxygen by the system.

Probe 28 within shell 12 and associated leads 29 are illustrated as components of an electrical or electronic gauging system. Instrumentation may be combined therewith to provide means for determining the quantity or level of liquid oxygen present within the container 10. Measuring systems for applications of this nature are well-known.

The construction of pressure-actuated, flow-control valve 20 is shown in greater detail in Fig. 2. Vent line 16, liquid line 15, and the liquid line component 19 each join valve body 30, and their respective passageways meet at a common point therein. Valve stem 31 is urged toward its closed position by compression spring 32, and when "closed" cooperates with valve seat 33 to stop flow of liquid oxygen from line 15 to line component 19.

Valve stem 31 is urged toward its "open" position by the action of bellows member 34 and compression spring 35 located therein. Through proper adjustment of screw 36, which is threaded through cap 37, the compression and tension stresses in spring 35 and bellows 34, respectively, can be adjusted. Movement of valve stem 31 is caused by the extension or retraction of bellows 34, and this in turn is caused by changes in pressure differential as between atmospheric pressure within the bellows and system pressure exterior the bellows, but interior of valve body 30. Care must be taken that a pressure seal is fully maintained between the system and atmospheric pressures within valve means 20. Atmospheric pressures are introduced interior of bellows member 34 through passageway 39.

As internal or system pressures exist or drop below the preselected pressure level, bellows member 34 is extended, and it causes valve stem 31 to move toward an "open" position thus admitting liquid oxygen into lines 16 and 19 and into plate heat exchanger 24. As liquid oxygen comes in contact with the heat exchanger the system pressure is increased due to boiling or evaporation of the liquid by virtue of temperature rises. To the extent that the demand for gaseous oxygen is exceeded by liquid oxygen conversion in the heat exchanger, an increased system pressure follows. This increased system pressure opposes and may overcome the forces first exerted by bellows 34 and spring 35 and consequently cause valve stem 31 to reseat on valve seat 33. Hence, in normal operation, the system working pressure should exist throughout a range of 65–70 p.s.i.g.; pressures to 110 p.s.i.g. maximum may exist during periods of no gaseous oxygen demand. However, liquid oxygen ceases to flow to the converter component at pressures above 70 p.s.i.g.

It will be observed that the liquid oxygen conversion system of my invention possesses many inherent advantages over known systems utilized for the conversion of oxygen from liquid to gaseous form.

The system of my invention utilizes only one liquid oxygen circuit from storage container to point of delivery and utilizes only one flow-control valve. The flow-control valve is pressure responsive and functions only in accordance with actual demand at the gaseous oxygen delivery point.

Flow of liquid-oxygen from the storage container is facilitated at all times during the operation of the system by low-temperature gas, pressure equalization and this feature in turn contributes toward conservation of the system oxygen supply by virtue of greatly delaying pressure build-up during periods of low demand. Further, those gases contributing toward such system pressure build-up are used first during subsequent periods of gas demand, before additional liquid oxygen is admitted into the conversion phase of the system.

Another advantage of the liquid oxygen conversion system of this invention lies in the ease with which it may be modified to accommodate added personnel. As indicated by dotted lines at 40 in Fig. 1, a take-off line might be provided in liquid line component 19, intermediate flow-control valve 20 and heat exchanger 24. Each such take-off line so provided would serve to carry liquid oxygen to another sub-system having like heat exchanger, oxygen regulator, and breathing mask components. Each additional sub-system should preferably be designed and sized to convert liquid oxygen and supply gaseous oxygen in accordance with the demands or requirements of its individual user. If several such sub-systems are added it may be required that a storage container 10 and a flow-control valve 20 of increased capacity be utilized.

The system of my invention furnishes a continuously uniform gaseous oxygen delivery, and with its improved design and superior form of heat exchanger component, there is no likelihood that using personnel will be subjected to severe or permanent injury.

Further, the liquid oxygen conversion system constituting this invention is comprised of a minimum number of components of standard design, is simple and economical to fabricate, and is relatively free of maintenance complexities. In addition, space requirements for installation are kept at a minimum.

It is to be understood that the form of the invention herewith shown and described is to be taken as the preferred embodiment of the same, but that various changes in the shape, size and arrangement of parts may be resorted to without departing from the spirit of the invention or the scope of the sub-joined claims.

I claim:

1. A gravity flow liquid oxygen conversion system comprising: a liquid oxygen storage container, a heat exchanger for converting liquid oxygen to gaseous oxygen, normally continuously open liquid oxygen conducting means connected to said storage container and connected to the inlet of said heat exchanger, normally-open pressure-responsive valve means in said liquid oxygen conducting means to regulate the flow of liquid oxygen from said container to said heat exchanger, and continuously-open line means venting gaseous oxygen from said storage container, said open line means having one extreme connected to said liquid oxygen conducting means intermediate said valve means and said heat exchanger.

2. A pressurized oxygen supply system comprising: a liquid oxygen storage container, a heat exchanger having an inlet for receiving liquid oxygen to be converted to gaseous oxygen, normally continuously open liquid oxygen conducting means connected to said storage container and connected to said heat exchanger inlet, normally-open flow control valve means contained in said liquid oxygen conducting means, and continuously-open vent line means connected at one extreme to said storage container and connected at another extreme to said liquid oxygen conducting means intermediate said valve means and said heat exchanger inlet, said conducting means and said open vent line means each maintaining said heat exchanger inlet in pressure-communicating relation to said storage container when said valve means is open and said open vent line means maintaining said heat exchanger inlet in pressure-communicating relation to said storage container when said valve means is closed.

3. A liquid oxygen conversion system comprised of: a storage container having liquid oxygen therein, a heat exchanger having a liquid inlet and having a gaseous oxygen outlet, continuous liquid-conducting line means connected to said container in communicating relation to the container bottom portion and connected to said heat exchanger liquid inlet, pressure-responsive valve means located in said liquid-conducting line means, and continuously-open vent means connected to said storage container in communicating relation to the container upper portion and connected to said liquid-conducting line means intermediate said valve means and said heat exchanger inlet, said storage container being continuously in pressure-communicating relation to said heat exchanger through said vent line means and a portion of said liquid-conducting line means.

4. The system defined in claim 3, wherein said valve means is normally-open and continuously urged toward a closed position, said valve means being moved toward said closed position when fluid pressure in said liquid-conducting line means and in said vent line means is increased.

5. A liquid oxygen conversion system for aircraft applications and the like which is comprised of: storage means for containing liquid oxygen, plate-like heat exchanger means having an integral passageway for converting said liquid oxygen to gaseous oxygen, liquid conducting line means for conducting said liquid oxygen from said storage means to said heat exchanger means, valve means contained in said conducting line means for regulating the flow of liquid oxygen therethrough, open vent line means for continually conducting gaseous oxygen between said storage means and said heat exchanger means, and means responsive to a gas pressure condition common to said heat exchanger means and said vent line means for controlling movement of said valve means, said vent line means being connected to said liquid oxygen conducting line means intermediate said valve means and said heat exchanger means.

References Cited in the file of this patent
UNITED STATES PATENTS

| | | |
|---|---|---|
| 1,878,317 | Picard | Sept. 20, 1932 |
| 2,110,022 | Kliesrath | Mar. 1, 1938 |
| 2,226,810 | Ensign et al. | Dec. 31, 1940 |
| 2,434,956 | Prentiss | Jan. 27, 1948 |
| 2,453,766 | Thayer | Nov. 16, 1948 |
| 2,645,906 | Ryan | July 21, 1953 |
| 2,834,187 | Loveday | May 13, 1958 |